US006677854B2

(12) United States Patent
Dix

(10) Patent No.: US 6,677,854 B2
(45) Date of Patent: Jan. 13, 2004

(54) REMOTE VEHICLE DIAGNOSTIC SYSTEM

(75) Inventor: Peter J. Dix, Naperville, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 09/972,138

(22) Filed: Oct. 5, 2001

(65) Prior Publication Data

US 2003/0095038 A1 May 22, 2003

(51) Int. Cl.[7] .................................................. B60Q 1/00

(52) U.S. Cl. .................... 340/438; 340/439; 340/457.4; 340/539.1; 340/539.24; 340/426.24

(58) Field of Search ................................ 340/438, 439, 340/457.4, 459, 539.1, 539.24, 426.24

(56) References Cited

U.S. PATENT DOCUMENTS

| | | | | |
|---|---|---|---|---|
| 4,305,623 A | * 12/1981 | Seabase | 303/54 |
| 4,379,331 A | * 4/1983 | Watson | 701/76 |
| 4,531,614 A | * 7/1985 | Naegeli | 187/240 |
| 4,583,425 A | * 4/1986 | Mann et al. | 475/83 |
| 4,805,875 A | * 2/1989 | Jackson et al. | 254/2 R |
| 5,823,612 A | * 10/1998 | Angelo | 296/37.12 |
| 5,931,878 A | * 8/1999 | Chapin | 701/30 |
| 5,982,288 A | * 11/1999 | Sawatari et al. | 340/601 |
| 6,036,275 A | * 3/2000 | Hansen et al. | 298/17 T |
| 6,206,302 B1 | * 3/2001 | Hansen et al. | 239/289 |
| 6,224,161 B1 | * 5/2001 | Hansen et al. | 298/17 T |

OTHER PUBLICATIONS

*ATMEL Single–Chip Bluetooth™ Controller, AT76C551,* Rev. 1612B–11/00.

* cited by examiner

*Primary Examiner*—Daryl Pope
(74) *Attorney, Agent, or Firm*—Rebecca Henkel

(57) ABSTRACT

A method for determining whether vehicle servicing or maintenance is required is disclosed. Vehicle information is downloaded to a remote maintenance computer via a wireless link. The information includes sensor data such as temperatures and pressures of fluid in the vehicle. The remote computer analyzes this information and determines what, if any maintenance is required. Once the maintenance is determined, the maintenance computer determines who should perform the maintenance, what supplies are required and when and where the maintenance should occur. The system is configured to schedule such maintenance for several different vehicles based on the information it has downloaded from those vehicles, the type of maintenance needed to determine the maintenance personnel, the parts and supplies, and the maintenance sites are available. As each vehicle is scheduled, a scheduling record is made of the type of maintenance needed, as well as the required maintenance personnel, the parts and supplies, the maintenance site and the time at which the maintenance will be performed. Scheduling of each subsequent vehicle will include checking previous scheduling records for maintenance personnel availability, maintenance parts and supplies availability, and maintenance site availability in order to prevent scheduling "collisions".

31 Claims, 7 Drawing Sheets

REMOTE VEHICLE DIAGNOSTIC SYSTEM

BACKGROUND OF THE INVENTION

Fleets of vehicles, such as taxis, rental cars, construction and agricultural vehicles are most often intended for the use of many individuals and they are used hard. A continuing problem with these vehicles is the need for constant maintenance and repair. Currently, intelligence in the vehicle alerts the driver that repairs or scheduled maintenance are needed. For example, engine oil and engine coolant sensors that measure such things as temperature, pressure and level are built in to the vehicles and are monitored by electronic controllers on the vehicles to determine if the various physical parameters that are monitored are within acceptable limits. If they are not within acceptable operating limits, a message is displayed on an operator's display panel to inform the operator that the limits have been exceeded. As another example, there are sensors on the vehicle that indicate elapsed engine hours or miles the vehicle has traveled. The vehicle controllers compare these elapsed time or distance signals against predetermined limits stored in a memory circuit of the electronic controller to determine whether a service interval is approaching. When a service interval is reached (e.g. 60,000 miles of travel or 200 engine hours), the controller indicates that service is needed, typically by displaying a message on the operator's display such as "service engine now".

These systems are quite useful for individual owner-operators, such as the owner of a car. They are less useful for fleet owners, since they provide these indications only to the operator, and not to the person in charge of maintenance. As a result, transient conditions, such as low oil pressure or high coolant temperature, to name but a couple, may never come to the attention of the person in charge of maintenance. Furthermore, the limits are fixed in the vehicle's memory, and cannot be changed based upon the experience of the person in charge of maintenance. In practice, the maintenance person must go to each vehicle in turn and individually check each vehicle to determine whether maintenance is needed.

What is needed therefore is a system for automatically determining whether maintenance is needed that does not require the personal inspection of each vehicle. It is an object of this invention to provide such a system and method.

SUMMARY OF THE INVENTION

It is an object of the present invention to provide a method for automatically determining whether vehicular maintenance is needed, comprising the steps of periodically storing a plurality of values indicative of physical parameters of a vehicle in an electronic memory of the vehicle, transmitting the plurality of values over at least one wireless link to a remote maintenance computer, analyzing the plurality of vehicle parameters in the remote maintenance computer to determine if maintenance is needed, transmitting data indicative of needed maintenance over the wireless link to the vehicle, and displaying a message indicative of the needed maintenance to the operator.

The message indicative of needed maintenance may direct the operator to stop a subsystem of the vehicle, such as an engine. It may direct the operator to have needed maintenance performed.

The physical parameters may include vehicle temperatures, pressures or fluid levels. It may also include the elapsed engine hours, as well as the time, date and location of the vehicle.

The vehicle may gather the data by periodically monitoring sensors on the vehicle, such as engine oil level, pressure and temperature sensors mounted to the engine. They may also include coolant water level and temperature sensors. They may also include hydraulic fluid sensors, such as sensors indicative of hydraulic fluid temperature and pressure.

The data gathered by the vehicle is transmitted over a wireless communications link to a central processor that stores the information from each vehicle in a data structure or structures that are associated with each vehicle. The data stored by the central controller may include any or all of the data items identified above. By analyzing the data associated with the vehicle, the central controller can take one or more actions relating to the servicing and maintenance of the vehicle. For example, it can determine whether specific servicing is necessary for the vehicle. This servicing can be routine servicing based at least upon the elapsed time of vehicle operation or distance traveled by the vehicle, or it can be based upon sensor readings indicative of engine or hydraulic pressures, temperatures, and levels. The central controller can also combine any of the data received from the vehicle with data previously received from the vehicle or with previous records of servicing stored in the central controller. The previous records of servicing may include data entered into the central controller by service personnel that have serviced the vehicle, such as the date and time of the servicing and the type of servicing performed. This data, in turn, may be used by the controller to determine whether future servicing is needed as well by combining the data communicated from the vehicle with the data indicative of past servicing.

Whenever the central controller determines that servicing is necessary, it takes one or more actions. These actions may include transmitting a signal back to the vehicle over a wireless link. This signal sent to the vehicle directs the vehicle to display a message to the operator indicating that the operator takes some vehicle-related action. The signal may direct the operator to take specific operator actions within the vehicle, such as traveling to a service location, or to shut down a vehicle system or subsystem, or direct the operator to limit the range of operations of the vehicle, such as not operating the vehicle above a certain speed.

The central controller may also schedule maintenance of the vehicle. This scheduling may include electronically contacting service personnel to direct them to perform the identified servicing. The scheduling may include determining the availability of service personnel and resources, such as the availability of necessary service equipment and personnel with the expertise to perform the servicing. The scheduling may also include determining the time and place of servicing, as well as selecting and ordering the necessary supplies for the servicing. To determine the time and location of servicing, the central controller may review servicing it has previously scheduled and is waiting to be done.

The central controller may send maintenance information to remote technicians over the Internet. These technicians may then perform repairs and transmit actual repair and maintenance information regarding the actual repairs performed to the vehicle. This information may then be transmitted by their remote computers back to the central controller (i.e. remote maintenance computer) over the Internet where it may be stored in association with any vehicle identifier.

BRIEF DESCRIPTION OF THE DRAWINGS

The present invention will become more fully understood from the following detailed description, taken in conjunction with the accompanying drawings, wherein like reference numerals refer to like parts, in which.

The invention will become more fully understood from the following detailed description when taken in conjunction with the accompanying drawings. Like reference numerals refer to like parts.

DETAILED DESCRIPTION OF THE PREFERRED EMBODIMENT

Figure 1:
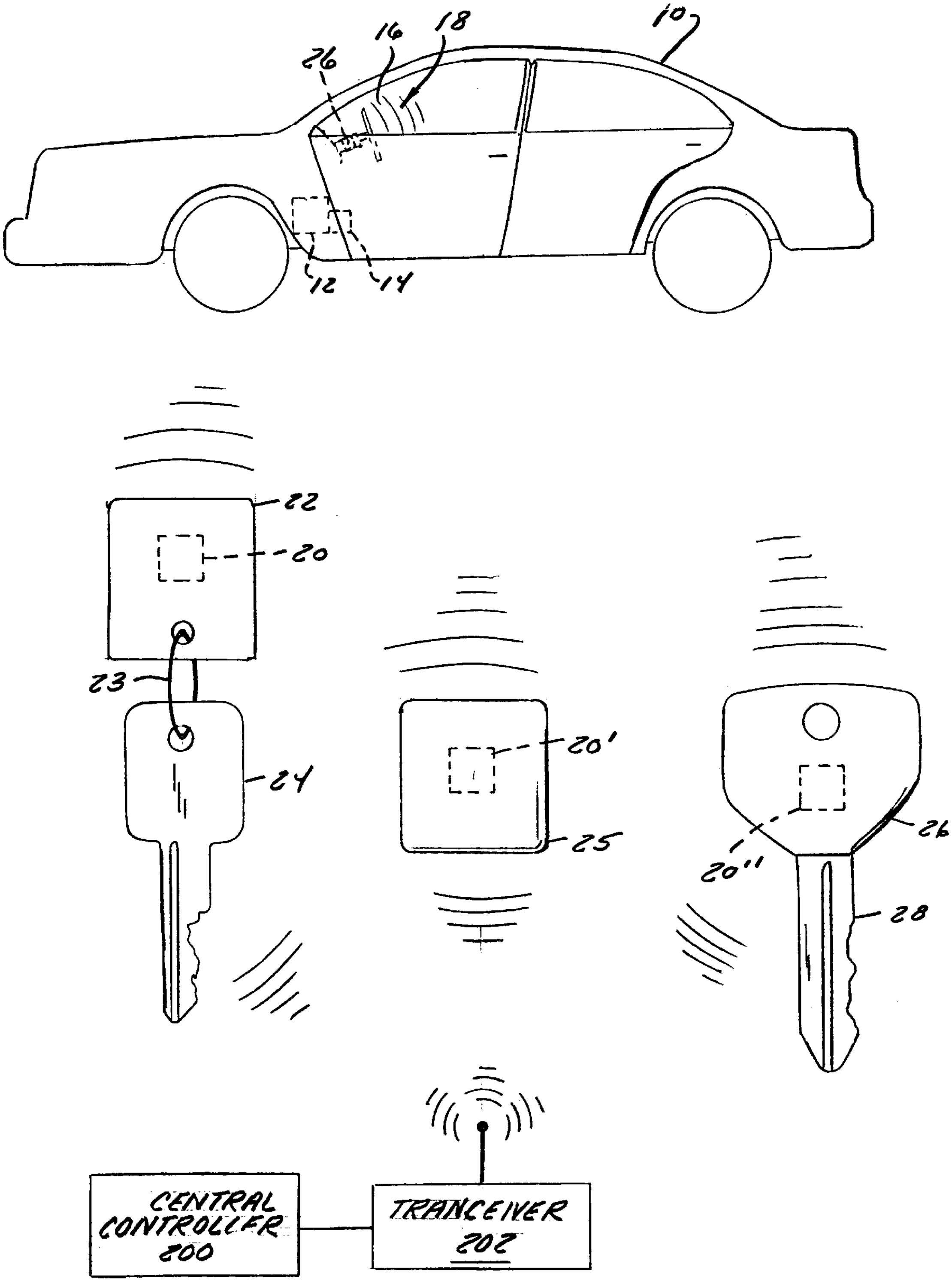
FIG. 1 illustrates the overall system, including a vehicle with a control system that is configured to communicate with a radio transponder and a central controller coupled to a central radio transceiver that is also configured to communicate with the transponder.

Referring to FIG. 1, a vehicle 10 has a control system 12 that communicates with a transponder 20 via vehicle transceiver 14. Transponder 20 in turn, communicates with a central controller 200 via a central radio transceiver 202. This provides bidirectional communication between the vehicle and the controller.

The information transmitted from the vehicle to the transponder includes status information regarding the operation and status of the vehicle, discussed in more detail below. This status information, in turn, is transmitted by transponder 20 to central controller 200. In this manner, the central controller receives vehicle status information.

Central controller 200, in turn, is configured to transmit signals to transponder 20, which transponder 20, in turn, transmits to vehicle 10. The signals transmitted to transponder 20 include information relating to vehicle servicing or operation that are described below in more detail.

Transceiver 14 generates an electromagnetic field 16 in operator's station 18 of the vehicle. This electromagnetic field impinges on transponder 20 that is carried by the operator to the vehicle. When the operator is adjacent to or in the vehicle, the electromagnetic field is sufficiently strong that it can energize transponder 20. In response to being energized, the transponder transmits data over radio waves to the radio transceiver, which reads the data and takes predetermined actions based upon that data.

Transponder 20 is in the form of a key fob, preferably molded into a plastic case 22 impervious to moisture (under typical operating conditions). Case 22 is mechanically coupled to an ignition key 24 by strap 23. Key 24 is configured to fit into and turn ignition switch 26 of the vehicle. In this arrangement the ignition key permits the operator to start the vehicle engine. The vehicle accesses transponder 20 to determine which vehicle functions, operations, systems or sub-systems the operator is permitted or not permitted to use.

Transponder 20' is an alternative embodiment of transponder 20, is preferably molded into a thin credit card-sized sheath 25. Again, it is preferably impervious to moisture under ordinary operating conditions. Transponder 20' is not mechanically coupled to a key, and is therefore easily carried in the operator's wallet, shirt pocket or pants pocket.

Transponder 20" is another alternative embodiment of transponder 20, wherein the transponder is molded into the plastic handgrip 26 of an ignition key 28.

In each of these three forms, the transponder functions the same, and therefore any explanation below regarding transponder 20 applies equally to any of the three embodiments 20, 20', and 20".

Figure 2:
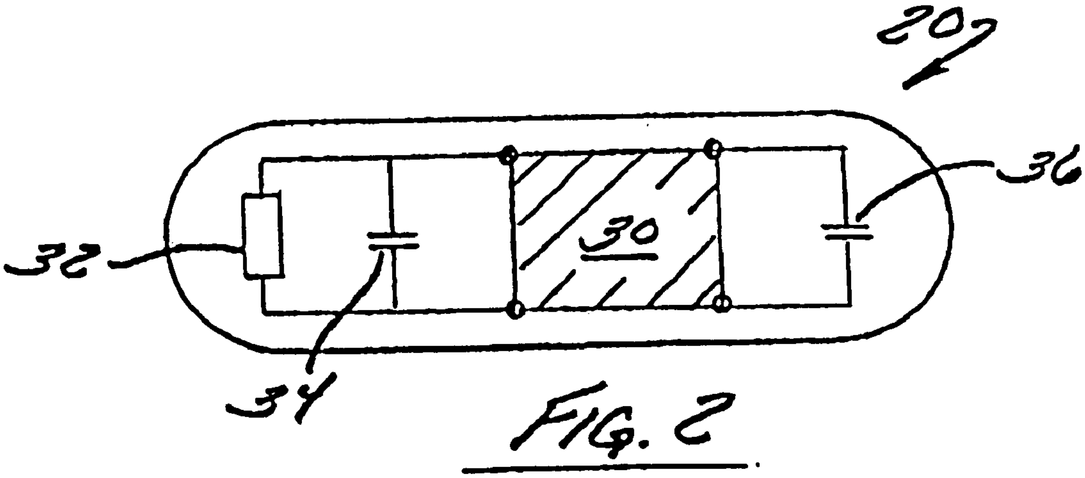
FIG. 2 is a detailed view of the transponder showing the microcontroller, digital memory and the antenna.

Referring now to FIG. 2, the transponder includes a microcontroller 30 in an integrated circuit package, an antenna 32 and a resonance capacitor 34 in series. A charge capacitor 36 is coupled to the microcontroller 30 and functions as its power source.

The transponder is preferably one of Texas Instruments RFID products, more preferably one of their Multipage Transponders (MPT), Selective Addressable Multipage Transponders (SAMPT), or Selective Addressable Multipage Transponders (Secure) (SAMPTS). These microcontrollers are programmed to provide individual and selectable read (and read-write) access to their internal digital memory. Their internal memory space contains 80 or more bits of stored information. The memory is preferably arranged in separately addressable pages of memory.

To energize the transponder, it is placed in electromagnetic field 16 generated by the radio transceiver (FIG. 1). This field oscillates at the resonant frequency of the antenna 32 and resonance capacitor 34, generating an oscillating current between these two components. This oscillating current is coupled to and charges capacitor 36. The charge saved in capacitor 36 is then used to power microcontroller 30.

Once microcontroller 30 is powered, it filters the signal that is generated in the antenna 32 and resonance capacitor 34 and extracts superimposed data carried by the electromagnetic field. Based on preprogrammed instructions that it contains in an integral read-only memory, microcontroller 30 responds to the received data, which includes read (and preferably write) instructions. If the received instructions are read instructions, microcontroller 30 selects a particular data item from its internal memory to be transmitted to the vehicle and transmits this data via antenna 32. Radio transceiver 14 receives the information transmitted by the transponder and processes it accordingly.

In one embodiment, the data stored in the memory of microcontroller 30 may include numeric values that are remotely downloaded from central controller 200 into the transponder. These values may be indicative of (1) a total distance which the operator is permitted to travel, (2) a geographical area in which the vehicle may only be operated, (3) allowed times and dates of operation, such as (i) the specific hours during the day when the vehicle may be operated or (ii) the specific dates on which it may be operated, (4) the total time of permitted operation, and (5) the permitted subsystems that the operator is allowed to use, and (6) messages that indicate required vehicle servicing.

In a second embodiment, the information stored in microcontroller 30 of the transponder may also include data downloaded from the vehicle itself, such as (1) the actual distance traveled by the vehicle, (2) the date and times of specific events, such as the time the vehicle was started, the time the vehicle was stopped and the elapsed time of engine operation, (3) time-triggered elapse records, such as service reminders and vehicle rental period expiration, (4) vehicle conditions, such as a threshold or maximum engine load experienced by the vehicle during operation, (4) the current odometer reading, (5) vehicle status, fault, or error conditions experienced during operation, such as engine oil pressure, engine oil temperature, engine coolant temperature, engine alternator current or voltage output, hydraulic fluid pressure, hydraulic fluid temperature, hydraulic fluid pressure, and (6) the amount of consumables remaining in vehicle, such as fuel level, engine coolant level, engine oil level, and hydraulic fluid level.

Figure 3:
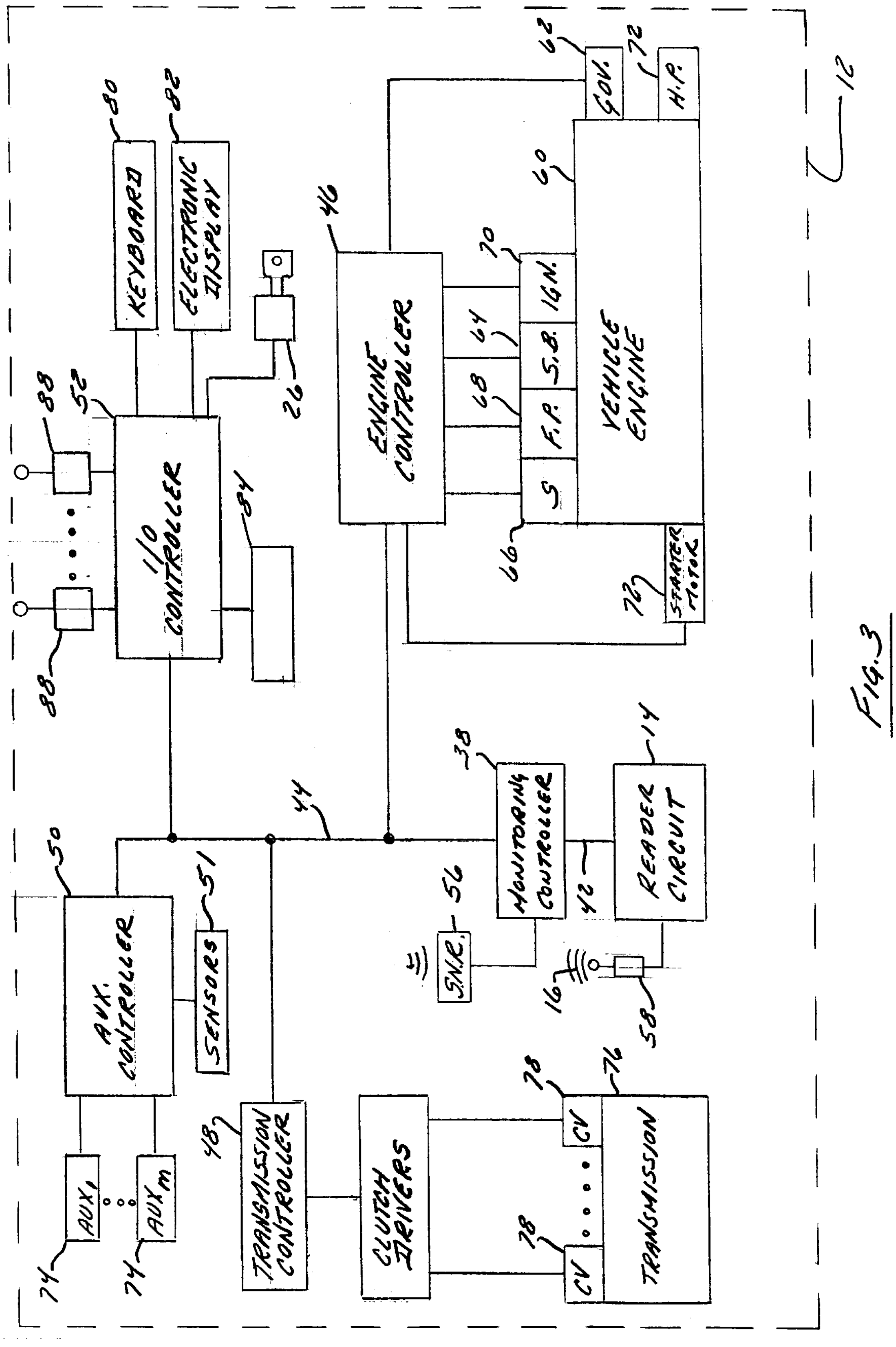
FIG. 3 is a detailed view of the vehicle's control system showing the plurality of vehicle subsystems or components and their interconnections, including the radio transceiver that reads the transponder.

FIG. 3 shows vehicle control system 12 of FIG. 1 in more detail. Control system 12 includes a vehicle status and monitoring controller 38 that is coupled to vehicular radio transceiver 14 over an RS-485 telecommunications link 42. System 12 also includes several other microprocessor-based controllers that are coupled together with monitoring controller 38 by vehicle serial bus 44. These controllers include an engine controller 46, a transmission controller 48, an auxiliary controller 50, and a user I/O controller 52.

Monitoring Controller

Monitoring controller 38 is coupled to a satellite navigation receiver 56 that is configured to receive radio transmissions from satellites and to convert them into data indicative of the vehicle's current location such as latitude and longitude. Controller 38 is also coupled to vehicular radio transceiver 14 that, in turn, communicates with transponder 20.

Radio transceiver 14 includes a control module such as Texas Instruments' RI-CTL-MB6A. The control module is the interface between the radio frequency module and controller 38. The control module controls the transmitting and receiving functions of the radio frequency module according to commands sent over the serial connection from controller 38 to the control module. The control module decodes the received RF signals, checks their validity and handles their conversion to a standard serial interface protocol—which, in the preferred embodiment, includes an RS-485 interface. Hence the RS 485 serial communication link 42 between radio transceiver 14 and controller 38.

A radio frequency module 58, such as Texas Instruments' RI-RFM-007B is coupled to radio transceiver 14 and handles the radio transmissions to and from transponder 20. Module 58 receives signals from transceiver 14 and actually generates the radio frequency signals that are transmitted through space to transponder 20.

Controller 38 directs radio transceiver 14 by issuing several commands over the RS-485 connection to the control module. These commands include a query command to query for any transponder in range, and a specific query command to query for a specific transponder by its embedded identification number. While it is possible for all the vehicle and operator information in transponder to be transmitted as one long string of bits, it is more efficient and fast to arrange such data into a series of "pages" in transponder 20, pages that can be individually retrieved by controller 38 on a page-by-page basis. In this manner, controller 38 need not wait until the entire contents of transponder are downloaded to radio transceiver 14 and hence to controller 38, but can selectively request specific items of information that are specific to the particular task that controller 38 is attempting to perform.

Once the radio transceiver 14 establishes contact with transponder, it then continues the communications session by sending a request to the transponder to download information from the memory of microprocessor 30 to the radio transceiver. Once the information is downloaded to transceiver 14 it is communicated to controller 38 for processing.

Controller 38 communicates with the other controllers by transmitting packets of data on the communications bus 44 extending between the various controllers on the vehicle. These packets of data may be broadcast to all the controllers with a header describing the contents of the packet, or they may be transmitted to individual controllers with a header including a controller address identifying the controller to which they are addressed, as well as information indicating the nature of the data in the packet. Any of the data items received from transponder are transmitted in this manner, as well as the position of the vehicle provided by receiver 56.

Controller 38 also receives information from the other controllers in the form of packetized data transmitted over bus 44. These packets include data gathered by the other controllers indicating vehicle status, such as elapsed hours of engine operation; engine RPM; engine load; engine throttle position; the distance traveled by the vehicle; engine oil level, pressure and temperature; engine coolant level and temperature; hydraulic fluid level, temperature and pressure; and engine alternator output (both current and voltage).

In addition, whenever the operator actuates any of the controls associated with I/O controller 52, the I/O controller transmits packets of information indicative of the operator's requests.

Diagnostic Data Saved

Each controller preferably has its own controller diagnostic routine and can identify a variety of controller failures that may occur, such as the failure of a sensor or a driver circuit for a particular sensor, or a broken cable coupling the sensor to the controller.

Each controller also determines whether a particular (and presumed good) sensor reading is within an acceptable range of operational values, such as checking the oil pressure sensor to see if the oil pressure is at least 35 psi or the coolant temperature sensor to see if coolant temperature is no greater than 100 degrees Celsius, or the engine speed sensor to see if the engine speed is above 600 rpm and below 2800 rpm.

Whenever each controller identifies these failure conditions, a record of their occurrence is made and saved in that controller's memory. Each of these records preferably includes a value or values indicative of the item that has failed (or has experienced an out-of-range condition indicative of failure), the type of failure, the time of failure, the date of failure, and the geographic location of the vehicle when the failure occurred. They also preferably include other parameters indicative of the vehicle's status at the time of failure, such as the gear ratio of the transmission, the engine throttle setting, the speed of the vehicle, and the load on the engine.

Controller 38 gathers these failure records and vehicle status information, and saves it in its memory circuits. Controller 38 later transmits this data to central controller 200 (via transponder 20) for it to use. Transponder 20 functions as a way of transporting data between system 12 and central controller 200. The data saved includes (1) data indicative of controller malfunctions, (2) sensor readings, (3) vehicle location (from receiver 56), (4) elapsed time of engine operation, and (5) distance traveled by the vehicle.

Sensor Data Saved

Controller 38 saves the actual sensor readings for transmission to central controller 200 via transponder 20. As each sensor value is placed on bus 44, controller 38 is configured to receive and record these values in the electronic memory of controller 38. In this manner, a time history of the sensor values is saved for later transmission by transceiver 14 to central controller 200 via transponder.

In addition to saving the sensor values themselves for forwarding to central controller 200, controller 38 processes the sensor values in several different ways before transmitting these processed values to transponder and thence to central controller 200. Controller 38 uses a variety of data reduction methods to extract significant data from the raw sensor values before forwarding these processed values to central controller 200 for further analysis.

For example, controller 38 is configured to calculate and save an average sensor value or values for each sensor. As controller 38 receives each sensor value placed on bus 44, it combines that value with previously saved values to compute an average sensor value or values. The preferred method is to calculate a time average of the raw sensor values that controller 38 receives.

As another example, controller 38 is configured to periodically and repeatedly determine a maximum and a minimum sensor value for each of the sensor values gathered over a predetermined interval. Each raw sensor value that controller 38 receives is compared with a previous minimum and maximum value for that sensor to determine whether or not the latest sensor value it receives falls within the previously calculated range. If the newly received sensor value is greater than the current maximum sensor reading, controller 38 replaces the current maximum sensor reading with the newly received sensor value and continues processing. If the newly received sensor value is less than the current minimum sensor reading, controller 38 replaces the current minimum sensor reading with the newly received sensor value and continues processing. In this manner, controller 38 repeatedly determines what the lowest and highest sensor readings have been,—the minimum and maximum values for the sensor.

In yet another embodiment, controller 38 is configured to reduce the data by performing a graphic analysis of the raw sensor data. In this embodiment, inside controller 38, the operating range of each sensor is divided into several sub-ranges. For example, the coolant temperature has been divided into the sub-ranges shown in Table 1, where "temp is the coolant temperature:

TABLE 1

| | |
|---|---|
| 1. | 80 < temp <= 90 C., |
| 2. | 90 < temp <= 95 C. |
| 3. | 95 < temp <= 98 C. |
| 4. | 98 < temp <= 100 C. |
| 5. | 100 < temp <= 102 C. |
| 6. | 102 < temp <= 105 C. |
| 7. | 105 C. < temp |

Each of the limiting values (the endpoints) of the sub-ranges is stored in a memory circuit of controller 38. As each raw sensor value (in this case the coolant temperature) is received, controller 38 compares that value with the limits of each of the sub-ranges to determine which of the sub-ranges includes the raw sensor value. Each one of the sub-ranges is associated with a sub-range counter that is incremented whenever controller 38 determines that a raw sensor value falls within that sub-range. This data reduction method reduces the sensor values to a histogram.

Controller 38 periodically sends this data to transceiver 14 and commands transceiver 14 to wirelessly transmit the data to transponder 20 for storage and subsequent transmission to central controller 200.

Engine Controller

Engine controller 46 is coupled to the vehicle's engine 60 which it monitors and controls. Engine 60 may be a spark ignition or a diesel engine. The way engine controller 46 controls the engine is by sending a signal to the engine's governor 62 typically indicative of a commanded fuel flow rate or power output. The governor, in response to this signal, varies the rack position of the fuel injector system (i.e. a mechanical system), or transmits an electronic signal to each of the fuel injectors (if an electrical injector system). Alternatively, it may open or close a combustion air valve or "throttle valve" that regulates the flow of air to each combustion chamber of the engine.

The Governor 62, if electronic, transmits a signal back to engine controller 46 that is indicative of the speed of the engine. As an alternative, a separate engine speed sensor 64 is provided, such as a shaft speed sensor or a sensor that monitors the fluctuations in electricity coming out of the engine's alternator. The frequency of the fluctuations is proportional to the speed of the engine. Engine controller 46 can determine not only the speed of the engine based upon the signals received from the alternator, but can also determine the voltage output current provided by the alternator, as well.

Engine controller 46 is also coupled to several sensors 66 that are themselves coupled to the engine to generate signals indicative of oil pressure (oil pressure sensor), oil temperature (oil temperature sensor), oil level (a level sensor disposed in the crankcase of the engine) engine coolant temperature (coolant temperature sensor), engine coolant level (level sensor disposed in the engine coolant supply), and engine load.

Engine controller 46 is also coupled to fuel pump 68 to either enable or disable the fuel pump by connecting or disconnecting the pump to an electric power source. The fuel pump itself uses mechanical or electrical feedback to automatically maintain the desired fuel pressure of the fuel provided to the engine.

Engine controller 46 is also coupled to ignition system 70 of the engine (in the case of spark ignition engines) to either energize or de-energize the ignition under computer control. In addition, engine controller 46 is coupled to the engine starting motor 72 to turn motor 72 on or off under computer control.

The engine controller places the sensor data it gathers or computes onto bus 44 to provide it to the other controllers for use in their operation. This includes, without limitation, engine speed, engine load, engine oil temperature, engine oil pressure, engine oil level, engine rack position, engine coolant temperature, engine coolant level, engine.

The engine controller is therefore configured to monitor various conditions of the engine, as well as directly control the operation of the engine by selectively enabling or disabling engine subsystems such as ignition, fuel, and starting. It is also configured to transmit packets of data indicative of the status of the engine on bus 44 for use by other controllers.

Auxiliary Controller

Auxiliary controller 50 controls the operation of various hydraulically powered subsystems of the vehicle. Engine 60 drives a hydraulic fuel pump 73 that provides a source of pressurized hydraulic fluid. This fluid is controlled and directed by auxiliary controller 50. Auxiliary controller 50 is coupled to and drives several hydraulic valves 74 ($AUX_1$ . . . $AUX_n$). These valves are typically on-off valves or pulse-width modulated proportional control valves that regulate a flow of hydraulic fluid.

If vehicle 10 is a backhoe or has a backhoe attachment, for example, controller 50 and valves 74 control the flow of fluid to a boom swing cylinder, a boom lift cylinder, a dipper cylinder and a bucket cylinder, which are each coupled to and controlled by at least one auxiliary valve 74. One or more valves are provided to control the flow of hydraulic fluid to or from various hydraulically driven implements that are mounted on the end of the backhoe arm.

If the vehicle is a dump truck, for example, controller 50 controls the flow of fluid to and from the cylinders that lift the box of the truck to dump it. If the vehicle is a loader, loader/backhoe, bulldozer, or skid steer loader, for example, controller 50 regulates the flow of fluid to and from the arm and bucket cylinders that raise, lower, and tilt the bucket. The operator can be permitted to operate or denied the operation of any or all of these subsystems by data in the transponder.

Auxiliary controller 50 is coupled to and reads a hydraulic fluid pressure sensor, a hydraulic fluid temperature sensor, and a hydraulic fluid level sensor that provide signals indicative of the hydraulic supply pressure, the temperature of the hydraulic fluid and the level of the hydraulic fluid in a hydraulic reservoir. These sensors are collectively shown as sensors 51. The sensor 51 signals indicate the status of the vehicle's hydraulic system. The signals are converted into numeric values by controller 50 and are used in its internal operations. In addition, these values are packetized and are placed on bus 44 for use by other controllers in the system for their internal operations as well.

Transmission Controller

Transmission controller 48 controls the shifting of the vehicle's transmission 76. Controller 48 is coupled to and drives several clutch control valves 78 ($CV_1$ . . . $CV_n$ in FIG. 3) via clutch driver circuit 49. The valves, in turn, control the flow of hydraulic fluid to and from hydraulic clutches in the transmission. These valves, depending upon the type of clutches employed, may be on-off valves or proportional control valves.

Controller 48 also selects the particular clutches necessary to engage the transmission in a particular gear ratio selected by the operator and sequentially energizes the clutch control valves 78 such that appropriate gears and shafts are engaged. The transmission is preferably a powershift transmission in which most, if not all, of the gear ratios of the transmission are selectable by filling or emptying hydraulic clutches coupled to valves 78.

Input/output controller 52 drives and responds to operator interface devices including keyboard 80, display 82, audio annunciator 84, and optional key switch 86. In addition, one or more control levers 88 are provided for receiving operator commands to control the hydraulic cylinders regulated by control valves 78 and auxiliary valves 74.

It is through these input devices that the operator communicates with the vehicle. The keyboard may be arranged as a closely-spaced array of buttons, or the buttons may be spread out around the operator's station to make them easier to operate.

Display 82 is preferably a liquid crystal display, an electroluminescent display or the like having a region for displaying messages. This region is configured to display a plurality of different messages indicating the data stored in transponder as well as information regarding the status of the vehicle, such as alarm or failure conditions including without limitation (1) engine coolant temperature too high, (2) engine coolant level too low, (3) engine oil temperature too high, (4) engine oil pressure too low, (5) engine oil level too low (6) hydraulic fluid pressure too low, (7) hydraulic fluid temperature too high.

In addition to displaying messages indicative of data generated internally by the various controllers, display 82 receives and displays messages transmitted by central controller 200. For example, and as will be discussed in more detail below, central controller 200 periodically determines what service the vehicle needs and takes action based on the required servicing. One of the actions it can take is transmitting a message to the vehicle indicating that the operator take some action or actions, such as shutting the engine down, stopping the vehicle, shutting down a vehicle subsystem (such as any of the subsystems) described herein, bringing the vehicle in for servicing, or scheduling service.

The messages can be displayed textually or symbolically. For example, if the vehicle is scheduled for maintenance, a text message such as "take the vehicle in for maintenance" could be shown on display 82. Alternatively a small symbol of a repairman could be illuminated, or a warning lamp could be lit.

Intra-Controller Communication

All the controllers on bus 44 are in constant communication with each other while the vehicle is operated.

As the transmission controller changes gear ratios and operates the transmission, it packetizes that information and places it on the bus for the other controllers to use.

As the engine controller controls the operation of the engine, it packetizes information relating to the engine and places that information on the bus for the other controllers use. This information includes all engine sensor data. Additionally, for as long as the engine is operating, the engine controller transmits packets of information indicating the elapsed time of engine operation.

As the auxiliary controller operates the various hydraulic valves, it packetizes information indicating which valves are open and closed, and by how much they are opened and closed, and places these packets on the bus for the other controllers to use.

As the input/output controller monitors the user input devices including levers 74, keyboard 80 and switch 86, it packetizes these operator requests and places the packets on the bus indicating the particular operational requests made by the operator. This includes, but is not limited to, the operator's attempts to operate the various subsystems of the vehicle he is not permitted to operate discussed above.

Whenever controller 38 receives information from central controller 200 relating to servicing and operator messages to be displayed, it packetizes this information and places it on the bus.

In this manner each controller is made fully aware of the state of the various devices and actuators controlled or monitored by the other controllers to use (or not to use) as each controller sees fit.

Just as the various controllers are configured to transmit packetized information on bus 44 for use by other controllers, they are also configured to receive packetized information transmitted from the other controllers and use this data internally for their own programmed operations.

Controller 38, for example receives all sensor data and status data that is placed on the bus by the other controllers, processes it and saves it for later communication with central controller 200 via transponder 20 in the manner described above.

I/O controller receives the packets relating to servicing and operator messages to be displayed from controller 38 and displays the appropriate messages.

The auxiliary controller receives the packets of data from the I/O controller indicating operator commands and opens and closes its associated valves 74 accordingly.

Vehicle Controller Structure

Figure 4:
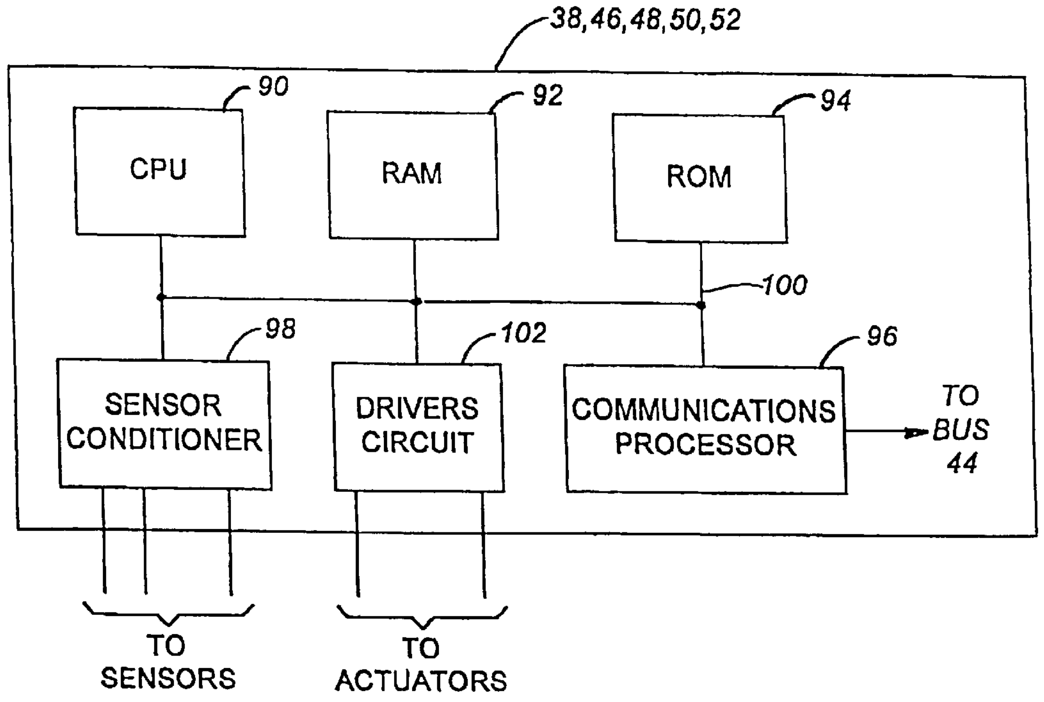
FIG. 4 illustrates an exemplary controller of those shown in FIG. 3.

FIG. 4 discloses the internal structure of the controllers of FIG. 3. All of the controllers have the same internal structure and therefore are represented by the single diagram shown in FIG. 4.

Each controller in FIG. 3 has a microprocessor 90, RAM memory 92 and ROM memory 94, as well as a dedicated communications processor 96 configured to handle all communications over bus 44 with the other controllers on the bus (FIG. 3).

Each controller also includes a sensor conditioning circuit 98 that interfaces the sensor signals received from the sensors and operator interface devices (levers 88 and keyboard 80) to bus 100. Circuit 98 filters and buffers the signals to reduce noise, and may include sample-and-hold subcircuits as well as analog-to-digital converters for processing analog sensor signals.

Each controller includes a driver circuit 102 that controls the application of power to the actuators, including, without limitation, the valves driven by the transmission and auxiliary controllers, the fuel pump and ignition system driven by the engine controller, and the electronic display driven by the I/O controller.

The microprocessor, RAM, ROM, and communications processor are all coupled together by control/data/address bus 100 that has a plurality of data, address, and control lines.

The ROM memory 94 contains the programmed instructions used by the microprocessor to control the operation of its associated controller.

Thus, each of the controllers shown in FIG. 3 is coupled to the other controllers of FIG. 3 by a serial communications bus 44. Each controller has its own internal communications bus 100 that couples the microprocessor, RAM, ROM, and dedicated communications processor of each controller. Each controller likewise controls one or more different subsystems of the vehicle and receives necessary data regarding the control of its subsystems from the other controllers.

Central Controller/Remote Maintenance Computer

The description above details how the vehicle control system 12 operates to transmit information regarding the vehicle's status to the transponder and thence to the central controller for processing. The description above also details how the vehicle control system 12 responds to data received from central controller 200 via the transponder. The next portion of the description is directed to the structure and operation of central controller 200. More particularly, to how controller 200 communicates with vehicle control system 12, how it processes the data sent by one or more vehicles having a control system 12, and how it prepares data to be transmitted back to the one or more vehicles from which it received information.

Figure 5:
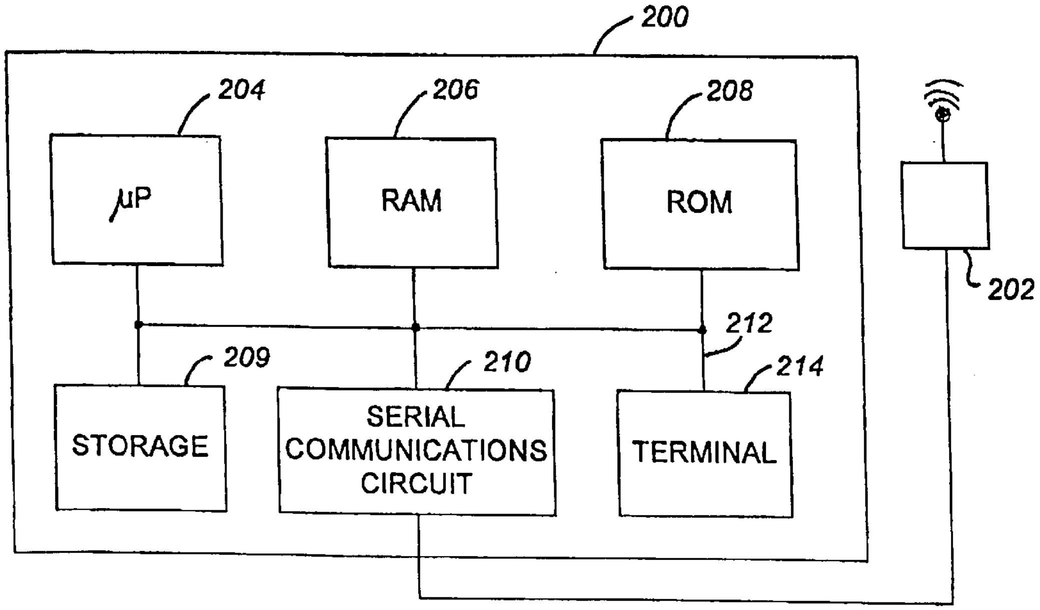
FIG. 5 is a detailed view of central controller 200 and transceiver 202 of FIG. 1.

FIG. 5 shows central controller 200 coupled to communications transceiver 202. Controller 200 includes a microprocessor 204, a random access memory (RAM) 206, a read-only memory (ROM) 208, a rewritable storage medium 209, and a serial communications circuit 210. These components are coupled to a control/data/address bus 212 through which inter-component communications occurs. A user terminal 214 that includes a keyboard and an electronic display is coupled to the central processor and permits the user to communicate with the central controller. In a preferred embodiment, controller 200 is a standard or typical personal computer using a Microsoft operating system.

Controller 200 is coupled to radio transceiver 202 through which it receives and transmits information. In a preferred embodiment, transceiver 202 is configured the same as transceiver 14 to permit communication with transponder when transponder is brought within range of transceiver 202.

Microprocessor 204 controls the operation of controller 200 in accordance with programmed instructions. Microprocessor 204 retrieves the instructions and sequentially executes them.

RAM 206 is a random access memory that stores working variables used by microprocessor 204 during execution of the programmed instructions.

ROM 208 is a read-only memory that stores the programmed instructions retrieved by microprocessor 204 during operation.

Storage medium 209 is preferably a mass storage device with a relatively fast access time, such as a hard disk drive, a CD-ROM drive, or flash memory. This device is used to store programmed instructions for execution by microprocessor 204 as well as to store scheduling data in the form of tables or lists of records that indicate the types of maintenance to be performed, the various tests to determine whether maintenance should be performed, the various maintenance sites as well as the various maintenance personnel and their qualifications.

The serial communications circuit 210 connects controller 200 to external devices and provides the connection between controller 200 and transceiver 202 in order to receive data from each of the vehicle controllers. The serial interface may be a modem, a network card, or a traditional serial port. In the example shown in FIG. 5, circuit 210 is a serial port is connected to transceiver 202 to receive information from transponder 20.

User terminal 214 permits the operator of controller 200 to communicate with the controller by reviewing information displayed on the terminal's screen and making selections from the keyboard. While a keyboard is the preferred mode of operation, a mouse in conjunction with a graphical user interface may be employed, such as Microsoft Windows, or the Apple Macintosh interface, or one of many window manager programs available for UNIX or UNIX work-alike operating systems.

Figure 6:
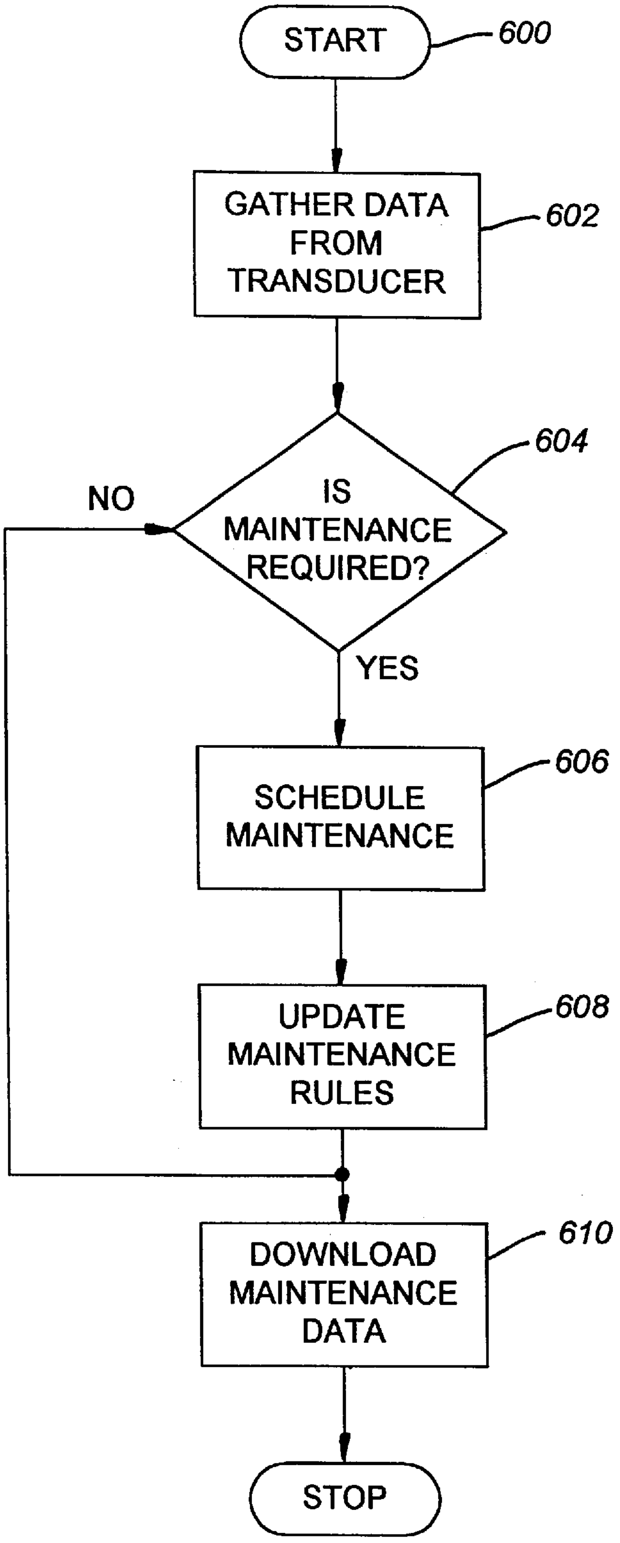
FIG. 6 is a flow chart of the process of communicating with the vehicle, retrieving vehicle status information, determining whether maintenance is needed, scheduling the maintenance, and updating the rules for determining whether the maintenance is needed or not.

The programmed instructions stored in storage device 209 direct controller 200 in the manner shown in FIG. 6.

Communications

As shown in block 602, the instructions direct controller 200 to communicate with transceiver 202 thereby gathering data downloaded from transponders 20. When the transponders are brought within range of transceiver 202, they download the data stored in them to transceiver 202. This data is then transmitted to controller 200 for further processing. Transponder 202 and controller 200 communicate not with single vehicle, but with many different vehicles and vehicle types configured like vehicle 10, for wireless communication. One of the important benefits of the system is in gathering data from a wide variety of vehicles 10 and scheduling maintenance and diagnosing problems for each such vehicle as will be described below.

As described above, controller 38 gathers a wide range of data and stores it in the transponder. All of this data is downloaded to controller 200 via transceiver 202 in order to determine whether maintenance is needed, and, if so, how, where and by whom the maintenance should be performed.

Maintenance Analysis

In block 604, controller 200 reviews the data downloaded from a transponder and determines whether maintenance is needed. In the simplest case, it compares a single parameter of vehicle or engine operation, such as the distance traveled by the vehicle, an engine fluid temperature, pressure or level, against a threshold value of that parameter associated with a particular maintenance procedure.

As just one example, an oil change operation is associated with an elapsed mileage of 3000 miles. To determine whether an oil change is called for using this 3000-mile rule, microprocessor 204 compares the elapsed mileage since the vehicle's last oil change with the number 3000, and if the elapsed mileage is greater, processor 204 determines that maintenance is due. Any or all of the vehicle data downloaded to controller 200 can be so compared with maintenance rules stored on controller 200.

Note that in the previous example, controller 200 compares the elapsed mileage since the last oil change with the current mileage. In order to do this, controller 200 saves the maintenance history of the vehicle on mass storage device 209. Thus, maintenance determinations are based not only on vehicle and engine parameters, but upon the maintenance history of that particular vehicle. Once each maintenance or service is performed, the vehicle's status, including its mileage, the identity of the maintenance person, the type of repair performed, the maintenance supplies used during the repair, and the time, date and location of the maintenance are stored on device 209, together with a unique vehicle identifier indicative of the vehicle. This identifier is preferably the VIN number. By comparing the unique vehicle identifier with maintenance records previously stored in the central controller, controller 200 can retrieve the past maintenance records for that vehicle and analyze those to determine whether maintenance is appropriate.

Controller 200 does not perform all maintenance analysis, however. Controllers on the vehicle may also perform a maintenance analysis and merely provide controller 200 with the results of that analysis (block 604). The vehicles themselves may generate a vehicle status indicator that by its very existence indicates that a specific maintenance activity is required. Controller 200 is configured to respond to these maintenance status signals and schedule the corresponding maintenance. For example, the engine oil level and engine coolant level sensors on the vehicle are configured to generate a signal that is indicative of a low fluid level. If the level is low (i.e. maintenance is needed), the sensors respond by generating an error signal indicative of the low-level error condition. Controller 200 determines that there is a need for oil merely by checking to see if the low oil or water level signal (the second signal) has been transmitted to it from the transponder (block 602). Some of the status signals sent from the vehicle to controller 200 therefore indicate a specific maintenance required. In effect, the vehicle "decides" that the oil or water level is too low, thereby doing its own maintenance analysis and controller 200 merely recognizes this fact and schedules maintenance.

Referring to block 608 in FIG. 6, controller 200 performs another step of maintenance analysis in that it is able to compare the analyses of different vehicles, preferably of the same make, model or type, to revise its own internal rules for analyzing whether maintenance is appropriate. These revised maintenance analysis rules will be subsequently applied whenever controller 200 performs future maintenance analyses on all vehicles of the same type or model.

As just one example, controller 200 is configured to periodically analyze the engine oil temperature versus engine hours (or vehicle mileage) for the several vehicles that it monitors. If the data for these vehicles indicate that engine oil temperature is rising significantly while still within the 3000-mile oil change interval, controller 200 will reduce the 3000-mile interval to a shorter oil change interval that keeps the engine oil temperature within acceptable limits.

Controller 200 gathers vehicle status information (e.g. oil temperature) from several vehicles, combining and reducing this data to determine whether the rule should be changed, and if so, by how much. In a preferred embodiment of this process, controller 200 saves engine oil temperature data, engine hours and mileage from each transponder (among the other vehicle parameters). Periodically, as shown in block C, it combines this oil temperature data with data similarly downloaded and saved from other vehicles. It averages the oil temperature versus engine hour data for all the vehicles at each of a plurality of engine hours. From this, an average oil temperature versus engine hour data set is produced. Controller 200 has oil temperature data from several different vehicles over several different time intervals of oil use, controller 200 averages the oil temperatures from several different vehicles for the same time interval. From this data, a plot of average oil temperature versus the age of that oil (in hours of engine use) is developed. This plot will typically show that average oil temperature increases as the oil ages—i.e. as the engine is operated longer and longer with the same oil. Controller 200 then looks up the age of the oil, (either in elapsed mileage of the vehicle or engine hours on a particular oil change) corresponding to 100 degrees Celsius. At 100 degrees Celsius, the oil is due to be replaced. Controller 20 then saves this new mileage or engine hour value for determining if an oil change is necessary.

Figure 7:
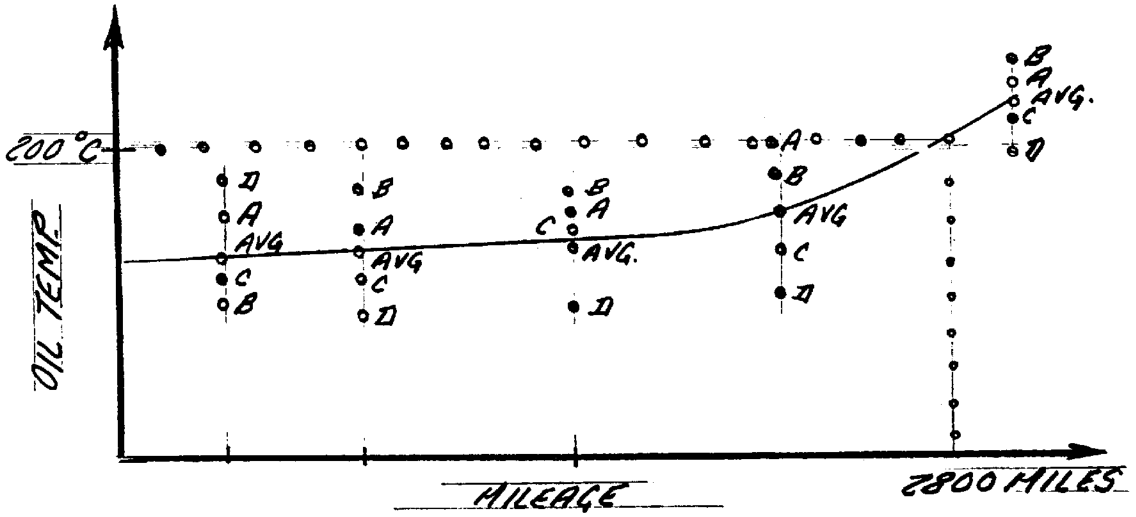
FIG. 7 is a chart indicating oil temperature at a specific mileage for several vehicles A, B, C, and D and showing how this data is combined to derive a new oil change maintenance interval (2800 miles) that is applied to all future vehicles.

FIG. 7 illustrates an example of this process. In the chart of FIG. 7, several temperatures versus elapsed mileage values are shown for several different vehicles A, B, C, and D. These values illustrate the oil temperatures downloaded to controller 200 from the transponders associated with each of those vehicles. At each engine hour interval for which there is data, controller 200 calculates the average of these values A, B, C, and D. These calculated average temperatures are shown as datapoints "*" in FIG. 7. Controller 200 then calculates a curve 702 that passes through the "AVG" values. This curve represents the average oil temperature based on the combined data downloaded from each of the vehicles, and therefore the best estimate of the oil performance (i.e. temperature per miles traveled) for all of the vehicles.

When the engine oil temperature reaches an average temperature of 100° F., it is due to be replaced. This temperature is reached at 2800 miles of vehicle travel, as noted by the dashed line extending from the average oil temperature curve 702 to the x-axis (the mileage axis) of the chart. Controller 200 determines this mileage value by interpolating between the points on the average oil temperature curve 702. Once it determines the value of mileage corresponding to an average oil temperature of 100 degrees (i.e. 2800 miles) it then saves this mileage value and uses it to determine whether an oil change is necessary, replacing the 3000-mile value described above.

This updating of maintenance rules shown need not be performed each and every time controller 200 determines whether a vehicle needs maintenance. For the oil change maintenance procedure, it will preferably be done only every month or so.

Arranging Maintenance

Once a vehicle is deemed to need a specific type (or types) of maintenance, controller 200 then proceeds to arrange the maintenance in block 606 of FIG. 6.

In the preferred embodiment, there are three different tasks that controller 200 performs to arrange maintenance: determining the required supplies, materials and tools needed for maintenance, determining the personnel appropriate for the maintenance, and determining the available locations for the maintenance.

For example, let us assume that controller 200 has determined that two procedures should be performed in block 606 of FIG. 6: oil change and wheel realignment. For each procedure, controller 200 maintains in device 209 a table of required materials/supplies/tools, the required skill level of maintenance personnel, and the locations at which the maintenance may be performed. This is illustrated in Table 2 below. For simplicity, there are only two different procedures shown in Table 2: an oil change and a wheel alignment. Clearly, many more procedures may be provided, since there are many more maintenance procedures that could be performed. For illustration purposes, however, we have limited the Table entries to two procedures. The table includes a value indicative of the type of procedure, the model of car for that procedure, the tools required for that procedure, the supplies required for that procedure, and the level of maintenance skill required for that procedure. The existing records in Table 2 were created and entered into that table by controller 200 when it analyzed vehicle status information from other previous vehicles and previously scheduled those vehicles for maintenance. The process followed to create the previous records in table 3 is the same as the process described herein.

TABLE 2

| MAINT. TYPE | PERSONNEL | TOOLS | SUPPLIES | LOCATION |
|---|---|---|---|---|
| ENGINE OIL CHANGE | BILL, SAM | FILTER WRENCH Z99 | OIL FILTER X123 FOUR QTS 10–30 OIL | A, E, B, D |
| WHEEL ALIGN-MENT | TIM, DICK | ALIGNMENT MACHINE 12 | | D |

Controller 200 maintains the list of required procedures for each particular vehicle either in RAM memory for extremely quick access, or stores them in device 209 if they are not needed immediately. It then iterates through this list to arrange for maintenance to be performed.

Once it retrieves a record for the particular desired maintenance procedure, it determines who is qualified to perform that procedure. This information is indicated in the field identified as "personnel", in Table 2. There are two maintenance people that can perform the job: Bill and Sam.

It then determines what supplies and tools are necessary. This information is indicated in the fields "tools" and "supplies" in Table 2. There are two supply items needed: four quarts of 10–30 oil, and one oil filter, number X123. There is a single tool needed: oil filter wrench "Z99".

It then determines what locations are necessary. This information is indicated in the fields identified in the field "location". As shown in table 2, there are four possible locations for service: service bay "A", service bay "E", service bay "B", and service bay "D".

Once it has identified the set of potential people, supplies and locations at which the maintenance can be performed, controller 200 then determines a unique combination of these items that will be arranged. To do this, controller 200 accesses a table containing data indicative of currently scheduled maintenance procedures. In its simplest form, as shown in Table 3, below, this table identifies what tools, personnel and maintenance location are already scheduled. The table associates repair personnel with tools and repair locations as well as an identifier of the vehicle being worked on at that time.

TABLE 3

| MAINT. TYPE | CAR | PERSON-NEL | LOCA-TION | TOOLS | SUP-PLIES | TIME/ DATE |
|---|---|---|---|---|---|---|
| TRANS. OIL CHANGE | 12 | BILL | B | WRENCH XYZ | 2 QTS. PQ7 FILTER 102 | 1–3 PM Mar. 23, 2000 |
| ENGINE OIL CHANGE | 76 | SAM | D | WRENCH Z99 | 4 QTS. OF 10–40 OIL FILTER X99 | 3–3:30 PM Mar. 23, 2000 |

Referring now to Table 3, the first record indicates that the transmission of car "12" is being repaired by "Bill" in service bay "B" between 1 and 3 PM on Mar. 23, 2000 using transmission filter wrench "XYZ". The repair requires transmission fluid "PQ7" and replacement transmission filter "102".

The second record in the table indicates that the engine oil filter of car "76" is being repaired in service bay "D" by "Sam" using oil filter wrench "Z99" on Mar. 23, 2000 between 3 pm and 3:30 pm. It requires four quarts of 10–40 oil and engine oil filter X99. These previously scheduled maintenance procedures indicate the availability and unavailability of maintenance personnel, service locations, tools, supplies, and time to perform the desired repairs.

As a practical matter, there will of course be many other records for different vehicles, tools, supplies and repair personnel in various combinations for the repair facilities managed by controller 200. For the sake of convenience and ease of illustration, however, we have provided only these two illustrative records for our hypothetical example.

By comparing the previously scheduled maintenance retrieved from Table 3, with the maintenance procedure requirements of Table 2, controller 200 determines when, where, by whom, with what tools and with what supplies the maintenance can be scheduled using database tabular comparison methods that are well known in the art. Although several different combinations of tools, supplies, personnel and locations are possible controller 200 selects the combination: Sam to change engine oil in service bay A using wrench Z99, 4 quarts of 10–30 and oil filter X123, between 2 and 3 pm on Mar. 23, 2000.

Controller 200 insures that the same maintenance person is not allocated to perform maintenance on two different vehicles at the same time. Furthermore, it insures that two different maintenance procedures requiring performance are not allocated simultaneously using the same tools. It insures that the same maintenance location is not allocated for maintenance on two different vehicles at the same time.

Once this combination is selected, controller 200 then arranges for the maintenance by updating the data in Table 3 to add a record indicative of the time, date, location, personnel, tools, and supplies it has selected. For this example, this additional record is shown below in Table 4.

TABLE 4

| MAINT. TYPE | CAR | PERSON-NEL | LOCA-TION | TOOLS | SUP-PLIES | TIME/ DATE |
|---|---|---|---|---|---|---|
| ENGINE OIL CHANGE | 96 | SAM | A | WRENCH Z99 | 4 QTS. 10–30 FILTER XD3 | 2–3 PM Mar. 23, 2000 |

As noted above, controller 200 then repeats this process for each of the desired maintenance procedures until all of the procedures identified in block 604 have been scheduled and recorded in Table 3.

Controller 200 electronically contacts each of the maintenance personnel that have been scheduled to perform maintenance procedures by transmitting an email message to maintenance personnel it selected to perform the maintenance procedures. This email message preferably includes data indicative of the vehicle to be repaired, the time and date of the maintenance, the location of the maintenance and the tools and supplied needed for the maintenance. Using the oil change example listed above, the email message would preferably recite the following: "SAM: OIL CHANGE ON CAR 96 AT 2–3 PM ON MAR. 23,2000 IN SERVICE BAY A. YOU WILL NEED WRENCH Z99, 4 QTS. OF 10–30 OIL." In the case of a disabled vehicle or a vehicle that is too far from the remote diagnostics computer to come in for maintenance, the message may instead include the actual location of the vehicle, based upon the signals received from the vehicle's satellite navigation receiver that were transmitted to the remote diagnostics computer and indicated the actual location of the vehicle.

While many technicians may be able to access the remote maintenance computer directly, they may also be at great distances from the compute and thus can retrieve their messages over the Internet using a computer local to them called herein the technician's computer. The remote diagnostics system is of particular value when managing a fleet of vehicles spread out across a region or a nation. In this situation, the capability of automatically monitoring all the fleet vehicle's wirelessly from a central location, and the capability of contacting repair technician's located all over the region at their own computers is of particular value. For that reason, FIGURE ?? shows a technician's computer ??? coupled to the remote maintenance computer 200 over the Internet.

Once the nature of the desired or required maintenance is determined, controller 200 is also configured to transmit a message to the operator of the vehicle to inform him of the maintenance or of other measures that should be taken based upon the maintenance analysis. Just as the vehicle provided its status to controller 200 over a wireless radio link, so controller 200 transmits its information to the vehicle over a wireless link. In the present embodiment, this data is transmitted to the transponder from transceiver 202. This is performed in block 610 of FIG. 6. The transponder is carried to the vehicle, and this information is then downloaded to the vehicle as described above.

Depending upon the nature of the maintenance, and hence the diagnosis of the problem, the message may direct the operator to take specific measures such as shutting off a particular vehicle subsystem, or stopping the vehicle entirely. It may also direct the operator to take the vehicle to a specific location, such as the maintenance location determined by controller 200.

Controller 200 determines at least some of the maintenance procedures for a particular vehicle based upon previous maintenance performed on that vehicle or similar vehicles of the same type (the example of the 3000 mile oil change, above). In order to do this, controller 200 is configured to store and retrieve information regarding the maintenance history of each vehicle that is serviced.

Once a vehicle has been serviced, the locally-based maintenance person accesses terminal 214 to enter a record indicative of the service performed, the vehicle that was serviced, and other data indicative of the vehicle's status during servicing, such as the vehicle's mileage or engine hours at servicing. This data is stored in storage device 209 for future reference by controller 200. The data is stored in a database table or tables that associate these values such that they can be retrieved using a unique vehicle identifier, such as a VIN number.

Remote maintenance personnel would receive the maintenance information over the Internet at computer ???. These maintenance technicians are too far from computer 200 to directly access terminal 214. They would prepare a message including the same information on technician computer ???, which is configured to generate these messages. This information, like that entered at terminal 214, is sent to computer 200 over the Internet, which computer then saves and stores the repair history information in the same manner as described above for information entered at terminal 214.

In all the foregoing examples, the wireless communications means was a telecommunications link using a transponder 20 located in a key or key fob. Data is transmitter from the vehicle to the transponder and thence from the transponder to the central controller 200. Nonetheless, and as noted above, a system using a Bluetooth communications circuit is also preferred. Several embodiments of alternative telecommunications systems are shown in FIG. 8.

Figure 8:
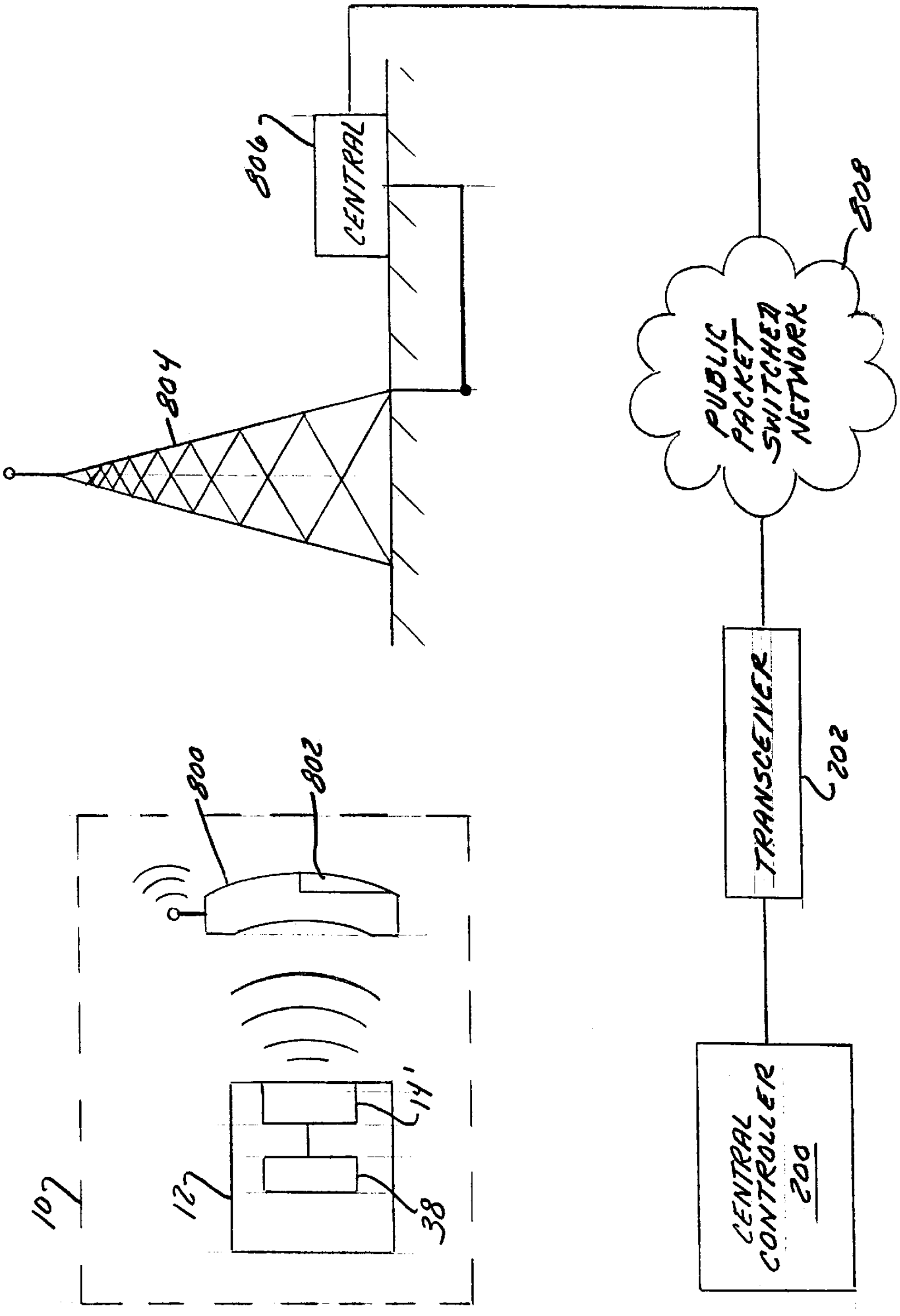
FIG. 8 is an overall system diagram showing how the transponder arrangement of the foregoing FIGURES can be replaced with a personal cellular telephone that is Bluetooth-enabled.

In FIG. 8, the transponder has been replaced with a Bluetooth controller circuit and a cellular telephone connection between the vehicle control system 12 and the central controller 200. In the configuration shown in FIG. 8, the vehicle's control system does not use a transponder reader circuit 14 in communication with a receiver 58 to transmit the packets of information to a transponder 20. Instead of this arrangement, the circuit of FIG. 8 uses a cellular telephone as an intermediate device between the vehicle controller and the central controller 200. As shown in that FIGURE, monitoring controller 38 is coupled to a Bluetooth controller circuit 14'. This device is preferably an Atmel AT76C555 Bluetooth controller.

The Atmel device implements the lower Bluetooth protocol layers up to the HCI transport in hardware/firmware. It also includes the L2CAP layer as part of a software stack running on the host system—i.e. monitoring controller 38. For this reason it is particularly well suited to be coupled to a UART or other serial communications controller of module 38.

In the embodiment of FIG. 8, Bluetooth controller 14' communicates with a cellular telephone 800 also configured with a Bluetooth communications circuit 802. An exemplary telephone and coupled Bluetooth communications circuit is the Motorola Timeport 270 cellular phone with Motorola's Bluetooth Clip-on ("Smart Module") accessory. Cellular phone 800, in turn, transmits the signals it receives from the vehicle to a cellular base station 804. This, in turn communicates to the central station 806 and from that to public packet switched network 808 and thence to transceiver 202 (in this example a modem or network card) and then to central controller 200.

The communications between the vehicle and central controller 200 are handled in real time. Unlike the embodiments of FIGS. 1–7, in which vehicle status information was communicated to a transponder and stored therein for later communication to central controller 200, vehicle status information is communicated directly to central controller 200 substantially in real time by using the cellular telephone and the cellular communications network of FIG. 8. In a similar fashion, the data transmitted back to the vehicle from central controller 200 are transmitted along the same path as shown in FIG. 8, but in the reverse direction.

The difference between the embodiment of FIG. 8 and the embodiment of the foregoing FIGS. 1–7 is that reader circuit 14 and transceiver 58 have been replaced Bluetooth controller 14', and that data is no longer stored in a transponder but is transmitted in real time over a cellular telephone network. Instead of storing data in a transponder that may be removed from the vehicle and manually carried into radio transmission range of transceiver 202, as described in conjunction with FIGS. 1–7, the embodiment of FIG. 8 permits the data to be sent in real time using a Bluetooth link to a cellular phone and thence to a public switched network 808 to which central controller 300 is coupled via transceiver 202. Other than this difference in circuitry and the mode of data transfer as a result, the operation of the embodiment of FIGS. 1–7 and the embodiment of FIG. 8 is the same. FIG. 8 merely illustrates the modifications to the FIGS. 1–7 embodiment required to perform the identical functions over a cellular telephone and a public switched network instead of the transponder.

While the embodiments illustrated in the FIGURES and described above are presently preferred, it should be understood that these embodiments are offered by way of example only. For example, the principles of the present invention may find applications in automotive, agricultural and construction vehicles. The wireless communications may occur using a transponder, as described herein, or may use other wireless communications devices, such as a cellular radio link between the vehicle and the maintenance computer, a Bluetooth-configured link or the like. In a similar fashion, controller 200 need not be coupled to a dedicated transceiver, but may receive communications over the Internet from a remotely located transceiver, such as a cellular telephone transceiver, or a Bluetooth-configured transceiver. The link between controller 200 and the transceiver need not be a serial communications link, but could be via a standard modem, a DSL modem, a network communication card communicating with a LAN or WAN. If the wireless communications link includes a hand-held device that device need not be a transponder that receives power in the form of radio frequency emissions from a vehicle, but could be a self-powered device. Alternatively it could be mechanically plugged into the vehicle, such as a PCMCIA card, smart-card" or the like. The table structure need not be limited to the particular table structure illustrated herein. For example, the tables shown here could be subdivided into several other tables that maintain the associations described herein via fields or indexes. The tables identified herein are not limited to the specific fields shown herein. Additional table fields and links to other tables could logically enhance the performance of the system, and thus we anticipate adding them. The tables shown herein are not limited to a particular data format. While the data in the tables is shown as characters, this is for ease of illustration. The tabular data will be maintained in controller 200 in the form of binary digits. The specific form of those digits forms no part of this invention, nor is the invention intended to be limited to any particular form. Generally speaking, the invention is not limited to a particular embodiment, but extends to various modifications that nevertheless fall within the scope of the appended claims.

What is claimed is:

1. A method for determining whether vehicle maintenance is required, comprising:

periodically monitoring electronic sensors on the vehicle that generate values indicative of a vehicle's operational status;

storing the plurality of values indicative of a vehicle's operational status in an electronic memory of the vehicle;

transmitting the plurality of values over at least one wireless communications link to a remote maintenance computer;

analyzing the plurality of values in the remote maintenance computer to determine if maintenance is appropriate;

transmitting data indicative of the need for maintenance to the vehicle over the wireless link to the vehicle; and displaying a message indicative of the required maintenance on an operator's display in the vehicle.

2. The method of claim 1, wherein displaying a message includes displaying a message directing the operator to suspend operation of at least one vehicle system.

3. The method of claim 2, wherein the plurality of values includes values indicative of an engine operating condition.

4. The method of claim 3, wherein the engine operating conditions include an engine temperature or a pressure.

5. The method of claim 3, wherein the engine operating conditions include an elapsed time of engine operation.

6. The method of claim 5, wherein transmitting the plurality of values includes substantially simultaneously transmitting a vehicle location.

7. The method of claim 1, wherein storing a plurality of values is preceded by periodically monitoring electronic sensors on the vehicle that generate values indicative of fluid temperatures or pressures.

8. The method of claim 7, wherein transmitting the plurality of values includes transmitting the plurality of values to a transponder and storing them in the transponder.

9. The method of claim 8, wherein transmitting the plurality of values to a transponder and storing them is followed by:

moving the transponder out of radio contact with a transceiver on the vehicle;

moving the transponder into radio contact with the remote maintenance computer; and downloading the plurality of values to the remote maintenance computer.

10. The method of claim 1 further comprising scheduling the determined maintenance.

11. The method of claim 10 wherein scheduling the determined maintenance includes:

determining an appropriate time for the determined maintenance;

determining the supplies required for the maintenance; and determining the required maintenance personnel to perform the maintenance.

12. The method of claim 11, wherein scheduling the determined maintenance includes electronically contacting the required maintenance personnel.

13. The method of claim 12, wherein electronically contacting the personnel includes electronically indicating a time for the maintenance to be performed.

14. The method of claim 1 wherein the plurality of values are transmitted automatically by an electronic controller on the vehicle.

15. The method of claim 1, wherein the data indicative of a need for maintenance are transmitted automatically by a remote diagnostic computer.

16. A method for scheduling a plurality of vehicles for maintenance, comprising:

periodically monitoring electronic sensors on the vehicles that generate values indicative of the vehicles' operational status;

storing a first plurality of values indicative of a first vehicle's operational status in an electronic memory of the first vehicle;

transmitting the first plurality of values over at least one wireless communications link to a remote maintenance computer;

analyzing the first plurality of values in the remote maintenance computer to determine if maintenance is appropriate;

storing a second plurality of values indicative of a second vehicle's operational status in an electronic memory of the second vehicle;

transmitting the second plurality of values over at least one wireless communications link to the remote maintenance computer;

analyzing the second plurality of values in the remote maintenance computer to determine if maintenance is appropriate;

electronically scheduling a first determined maintenance of the first vehicle; and electronically scheduling a second determined maintenance for the second vehicle based upon the first determined maintenance of the first vehicle.

17. The method of claim 16, wherein electronically scheduling the first determined maintenance includes electronically assigning a first maintenance person to perform the first determined maintenance.

18. The method of claim 16, wherein electronically determining the first determined maintenance includes electronically allocating a first maintenance time for the first determined maintenance.

19. The method of claim 16, wherein electronically determining the first determined maintenance includes electronically allocating first maintenance supplies required for the first determined maintenance.

20. The method of claim 16, wherein electronically determining the first determined maintenance includes electronically reserving a first maintenance site for the first determined maintenance to be performed.

21. The method of claim 18, wherein electronically scheduling the second determined maintenance includes electronically preventing the second determined maintenance from occurring at the first maintenance time with the first maintenance person.

22. The method of claim 17, wherein electronically scheduling the second determined maintenance includes electronically preventing the allocation of first maintenance supplies for the second determined maintenance.

23. The method of claim 16, wherein electronically scheduling the second determined maintenance includes preventing the second determined maintenance from using a maintenance site previously electronically scheduled to be used for the first determined maintenance based at least partially on the previous allocation of that site for the first determined maintenance.

24. A method for determining whether vehicle maintenance is required, comprising:

periodically monitoring electronic sensors on the vehicle that generate values indicative of a vehicle's operational status;

storing the plurality of values indicative of a vehicle's operational status in an electronic memory of the vehicle;

transmitting the plurality of values over at least one wireless communications link to a remote maintenance computer;

analyzing the plurality of values in the remote maintenance computer to determine if maintenance is appropriate;

transmitting data indicative of the need for maintenance to a computer over the Internet; and providing the transmitted data to a repair technician.

25. The method of claim 24, wherein the transmitted data includes data indicative of the vehicle.

26. The method of claim 25, wherein the transmitted data includes data indicative of the vehicle's location.

27. The method of claim 26, wherein the transmitted data includes data indicative of a component to be replaced or repaired.

28. The method of claim 25, further including:

transmitting repair history information of the vehicle to the remote maintenance computer indicative of an actual repair performed in association with the data indicative of the vehicle; and storing the repair history information in the remote maintenance computer in association with the data indicative of the vehicle.

29. A system that provides for the diagnosis of vehicle problems at a location remote from a vehicle, comprising:

at least one electronic controller mounted on the vehicle and coupled to a plurality of sensors disposed to sense a plurality of vehicle operational parameters, the at least one controller further including a telecommunications circuit configured to wirelessly transmit data provided by the plurality of sensors that is indicative of the plurality of vehicle operational parameters;

a remote maintenance computer including at least one data structure having plurality of maintenance rules associated with specific values of the vehicle operational parameters, wherein the computer is configured to receive the data provided by the sensors and to electronically determine at least one maintenance procedure based upon the data provided by the sensors; and a technician computer coupled to the remote maintenance computer over the Internet and configured to receive data indicative of the at least one maintenance procedure from the remote maintenance.

30. The system of claim 29, wherein the technician computer is further configured to receive data indicative of an actual maintenance procedure performed by a technician on the vehicle and to transmit data indicative of the actual maintenance procedure to the remote maintenance computer over the Internet.

31. The system of claim 30, wherein the remote maintenance computer is configured to receive the data indicative of the actual maintenance procedure performed on the vehicle and to store the actual maintenance procedure on the remote maintenance computer in association with data indicative of the vehicle.

* * * * *